(12) United States Patent
Colglazier

(10) Patent No.: US 8,745,334 B2
(45) Date of Patent: Jun. 3, 2014

(54) SECTORED CACHE REPLACEMENT ALGORITHM FOR REDUCING MEMORY WRITEBACKS

(75) Inventor: Daniel J. Colglazier, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/486,304

(22) Filed: Jun. 17, 2009

(65) Prior Publication Data

US 2010/0325365 A1    Dec. 23, 2010

(51) Int. Cl.
*G06F 12/00* (2006.01)
*G06F 13/00* (2006.01)
*G06F 13/28* (2006.01)

(52) U.S. Cl.
USPC ............... 711/136; 711/133; 711/E12.001; 711/E12.022

(58) Field of Classification Search
CPC .. G06F 12/127; G06F 12/128; G06F 12/0864
USPC ............... 711/136, 133, E12.001, E12.022
See application file for complete search history.

(56) References Cited

U.S. PATENT DOCUMENTS

| | | | |
|---|---|---|---|
| 4,493,026 A | | 1/1985 | Olnowich |
| 5,467,460 A | * | 11/1995 | Patel ............................. 711/143 |
| 5,572,660 A | | 11/1996 | Jones |
| 5,611,071 A | | 3/1997 | Martinez, Jr. |
| 6,282,617 B1 | | 8/2001 | Tirumala et al. |
| 6,393,525 B1 | * | 5/2002 | Wilkerson et al. ............ 711/136 |
| 6,823,427 B1 | * | 11/2004 | Sander et al. .................. 711/136 |
| 2004/0225842 A1 | * | 11/2004 | Rowlands et al. ............. 711/133 |
| 2006/0069876 A1 | | 3/2006 | Bansal et al. |
| 2006/0085600 A1 | * | 4/2006 | Miyashita et al. ............ 711/128 |
| 2009/0113132 A1 | * | 4/2009 | Cain et al. ..................... 711/133 |

OTHER PUBLICATIONS

David Paul Crane, UK Patent Application, GB 2 214 669 A, published Sep. 6, 1989.*
Muhich, J.S. et al. Cache Replacement Utilizing an Enhanced LRU Replacement Algorithm for Better Overall System Performance. [online]. Retrieved from the Internet <URL:http://www.ip.com>. IP.COM No. IPCOM000112332D, Apr. 1, 1994.
H. Diab, and H. Tabbara, "Performance-oriented design of cache memory using fuzzy replacement policy," The 2000 Symposium on Performance Evaluation of Computer and Telecommunication Systems (SPECTS'2K), Vancouver, Canada, Jul. 16-20, 2000.

* cited by examiner

*Primary Examiner* — Sheng-Jen Tsai
(74) *Attorney, Agent, or Firm* — The Steadman Law Firm PLLC; Thomas E. Tyson

(57) ABSTRACT

An improved sectored cache replacement algorithm is implemented via a method and computer program product. The method and computer program product select a cache sector among a plurality of cache sectors for replacement in a computer system. The method may comprise selecting a cache sector to be replaced that is not the most recently used and that has the least amount of modified data. In the case in which there is a tie among cache sectors, the sector to be replaced may be the sector among such cache sectors with the least amount of valid data. In the case in which there is still a tie among cache sectors, the sector to be replaced may be randomly selected among such cache sectors. Unlike conventional sectored cache replacement algorithms, the improved algorithm implemented by the method and computer program product accounts for both hit rate and bus utilization.

15 Claims, 5 Drawing Sheets

First Example: All Sectors Invalid

Most Recently Used Sector: Sector A

| Set Address | Address Tag | Valid Bit | Modified Bit | Data |
|---|---|---|---|---|
| A | Address Tag A | Invalid | Invalid | Invalid |
|  |  | Invalid | Invalid | Invalid |
|  |  | Invalid | Invalid | Invalid |
|  |  | Invalid | Invalid | Invalid |

| Set Address | Address Tag | Valid Bit | Modified Bit | Data |
|---|---|---|---|---|
| B | Address Tag B | Invalid | Invalid | Invalid |
|  |  | Invalid | Invalid | Invalid |
|  |  | Invalid | Invalid | Invalid |
|  |  | Invalid | Invalid | Invalid |

| Set Address | Address Tag | Valid Bit | Modified Bit | Data |
|---|---|---|---|---|
| C | Address Tag C | Invalid | Invalid | Invalid |
|  |  | Invalid | Invalid | Invalid |
|  |  | Invalid | Invalid | Invalid |
|  |  | Invalid | Invalid | Invalid |

| Set Address | Address Tag | Valid Bit | Modified Bit | Data |
|---|---|---|---|---|
| D | Address Tag D | Invalid | Invalid | Invalid |
|  |  | Invalid | Invalid | Invalid |
|  |  | Invalid | Invalid | Invalid |
|  |  | Invalid | Invalid | Invalid |

Fig. 2

Second Example: One Sector Has the Least Modified Data

Most Recently Used Sector: Sector A

| Set Address | Address Tag | Valid Bit | Modified Bit | Data |
|---|---|---|---|---|
| A | Address Tag A | Valid | Clean | Data A-0 |
| | | Invalid | Invalid | Invalid |
| | | Invalid | Invalid | Invalid |
| | | Invalid | Invalid | Invalid |

| Set Address | Address Tag | Valid Bit | Modified Bit | Data |
|---|---|---|---|---|
| B | Address Tag B | Valid | Clean | Data B-0 |
| | | Valid | Modified | Data B-1 |
| | | Valid | Clean | Data B-2 |
| | | Valid | Modified | Data B-3 |

| Set Address | Address Tag | Valid Bit | Modified Bit | Data |
|---|---|---|---|---|
| C | Address Tag C | Invalid | Invalid | Invalid |
| | | Valid | Clean | Data C-1 |
| | | Valid | Modified | Data C-2 |
| | | Invalid | Invalid | Invalid |

| Set Address | Address Tag | Valid Bit | Modified Bit | Data |
|---|---|---|---|---|
| D | Address Tag D | Valid | Modified | Data D-0 |
| | | Valid | Modified | Data D-1 |
| | | Invalid | Invalid | Invalid |
| | | Valid | Modified | Data D-3 |

Fig. 3

Third Example: Two Sectors Have the Least Modified Data, One Sector Has the Least Valid Data

Most Recently Used Sector: Sector A

| Set Address | Address Tag | Valid Bit | Modified Bit | Data |
|---|---|---|---|---|
| A | Address Tag A | Valid | Clean | Data A-0 |
|   |   | Invalid | Invalid | Invalid |
|   |   | Invalid | Invalid | Invalid |
|   |   | Invalid | Invalid | Invalid |

| Set Address | Address Tag | Valid Bit | Modified Bit | Data |
|---|---|---|---|---|
| B | Address Tag B | Valid | Clean | Data B-0 |
|   |   | Valid | Modified | Data B-1 |
|   |   | Valid | Clean | Data B-2 |
|   |   | Valid | Modified | Data B-3 |

| Set Address | Address Tag | Valid Bit | Modified Bit | Data |
|---|---|---|---|---|
| C | Address Tag C | Invalid | Invalid | Invalid |
|   |   | Valid | Modified | Data C-1 |
|   |   | Valid | Modified | Data C-2 |
|   |   | Invalid | Invalid | Invalid |

| Set Address | Address Tag | Valid Bit | Modified Bit | Data |
|---|---|---|---|---|
| D | Address Tag D | Valid | Modified | Data D-0 |
|   |   | Valid | Modified | Data D-1 |
|   |   | Invalid | Invalid | Invalid |
|   |   | Valid | Modified | Data D-3 |

Fig. 4

Fourth Example: Two Sectors Have the Least Modified Data, Two Sectors Have the Least Valid Data

Most Recently Used Sector: Sector A

| Set Address | Address Tag | Valid Bit | Modified Bit | Data |
|---|---|---|---|---|
| A | Address Tag A | Valid | Clean | Data A - 0 |
| | | Invalid | Invalid | Invalid |
| | | Invalid | Invalid | Invalid |
| | | Invalid | Invalid | Invalid |

| Set Address | Address Tag | Valid Bit | Modified Bit | Data |
|---|---|---|---|---|
| B | Address Tag B | Valid | Clean | Data B - 0 |
| | | Valid | Modified | Data B - 1 |
| | | Invalid | Invalid | Invalid |
| | | Valid | Modified | Data B - 3 |

| Set Address | Address Tag | Valid Bit | Modified Bit | Data |
|---|---|---|---|---|
| C | Address Tag C | Invalid | Invalid | Invalid |
| | | Valid | Modified | Data C - 1 |
| | | Valid | Modified | Data C - 2 |
| | | Valid | Clean | Data C - 3 |

| Set Address | Address Tag | Valid Bit | Modified Bit | Data |
|---|---|---|---|---|
| D | Address Tag D | Valid | Modified | Data D - 0 |
| | | Valid | Modified | Data D - 1 |
| | | Invalid | Invalid | Invalid |
| | | Valid | Modified | Data D - 3 |

Fig. 5

SECTORED CACHE REPLACEMENT ALGORITHM FOR REDUCING MEMORY WRITEBACKS

FIELD OF THE INVENTION

The various embodiments described herein relate to the field of computer memory optimization. More specifically, the various embodiments provide an algorithm for sectored cache replacement, with the objective of reducing memory writebacks.

BACKGROUND OF THE INVENTION

Computer systems need increasingly faster and larger memory to accommodate ongoing technological advances. However, faster memory is generally more expensive than slower memory, and larger memory is generally slower than smaller memory. Cache memory is used in computer systems to provide fast, cost-effective memory access. Cache memory is smaller and faster than main memory. While cache memory is expensive due to its relatively fast speed, it is cost-effective because it is smaller than main memory. Most processor requests are found in the cache and are provided at a fast access rate. Only processor requests not found in the cache memory require accesses to main memory at its slower access rate.

If a processor request is found in a cache, a cache hit has occurred. Conversely, if a processor request is not found in a cache, a cache miss has occurred. A primary objective when designing a cache is to improve the cache hit rate, which may be done in part by increasing cache size. The larger the size of a cache, the more likely that processor requests are found there and are accessed at the faster cache access rate.

Unfortunately, larger caches are more costly because they require more space to store the cached information. Along with the cached information, status information needs to be kept in a directory to keep track of which segment of memory is stored in a particular cache location and its state. This may be done on a cache line basis, with one entry for each cache line. A cache in which status information is stored in a directory on a cache line basis is referred to as a non-sectored cache.

Table 1 provides an example of a non-sectored cache. Each directory entry contains one cache line, the address of the cache line, and bits indicating whether or not the cache line is valid and/or modified. There is no relationship between the cache lines with respect to their addresses. Replacement is performed by individual cache line.

TABLE 1

| Set Address | Address Tag   | Valid Bit | Modified Bit | Data    |
|-------------|---------------|-----------|--------------|---------|
| 0           | Address Tag 0 | Valid     | Modified     | Data 0  |
| 1           | Invalid       | Invalid   | Invalid      | Invalid |
| 2           | Address Tag 2 | Valid     | Clean        | Data 2  |
| 3           | Address Tag 3 | Valid     | Modified     | Data 3  |
| 4           | Address Tag 4 | Valid     | Clean        | Data 4  |
| 5           | Invalid       | Invalid   | Invalid      | Invalid |
| 6           | Address Tag 6 | Valid     | Clean        | Data 6  |
| 7           | Address Tag 7 | Valid     | Modified     | Data 7  |

As mentioned above, each cache line contains a bit indicating whether or not the corresponding cache data is valid. This bit indicates whether or not the data is valid for the entry. Initially, the valid bit will indicate that the corresponding cache data is invalid, since a cache at initialization merely contains random 1s and 0s. Once data is written for a cache line, the valid bit for that cache line will be set to indicate that the corresponding cache data is valid. However, the valid bit for a cache line subsequently may be set to indicate invalidity once again in certain situations. For example, when two or more caches have a copy of the same cache line and one of these caches modifies its version of the cache line, the other caches must invalidate their versions of the cache line, since their versions of the cache line are now outdated. To perform such invalidation, the caches with the outdated versions of the cache line may set the valid bit of the affected cache line to indicate that the corresponding cache data is now invalid.

Furthermore, as mentioned above, each cache line contains a bit indicating whether the corresponding cache data has been modified. The various embodiments described herein assume that a "write back" cache write policy is to be used. According to the write back cache write policy, writes initially modify data in the cache only, and thus data in main memory corresponding to modified cache data is modified only once a cache line corresponding to such modified cache data is to be replaced. That is to say, when a cache line corresponding to modified cache data is to be replaced, the modified cache data is "written back" to main memory.

In accordance with the write back policy, when a cache line is to be replaced but the corresponding cache data has not been modified, such cache line may be written over without first writing the corresponding cache data back to main memory. Such cache line may be identified by having its modified bit indicate that it is "clean". Conversely, when a cache line is to be replaced but the corresponding cache data has been modified, according to the write back policy, the corresponding data of such cache line must be written back to main memory. Such cache line may be identified by having its modified bit indicate that it is "modified".

Non-sectored caches are advantageous in that they provide increased flexibility with respect to where a cache line can be placed and individual cache line replacement resulting in the best possible cache hit rate. However, since status information is stored on a cache line basis, a non-sectored cache may occupy substantial directory space.

One way to save directory space is to use a sectored cache. A sectored cache is divided into sectors, and each sector is further divided into subsectors. Each subsector of a sector is related by a matching set of address bits. Only the address of the sector must be kept in the directory rather than the address of each subsector, thus reducing necessary directory space. Status information is kept on each subsector.

Table 2 provides an example of a sectored cache with two sectors. Each sector in this case contains four subsectors. All of the subsectors contain an address pattern in the address tag and are distinguished from each other by a few address bits that determine their position. The subsectors are somewhat limited with respect to the positions in which they can be placed. Bits indicating whether or not a subsector is valid and/or modified are stored in the directory for each subsector. As mentioned above, a key advantage of the sectored cache is that only a fraction of the address tags need to be stored in the directory, thus saving considerable space. This is especially important when the directory is physically located apart from the cache data, such as with a processor with an internal directory and an external data cache. Replacements within a sectored cache must be done on a sector basis, meaning that multiple modified subsectors may be replaced during a replacement. Thus, a single sector replacement may require multiple writebacks of modified subsectors to main memory.

TABLE 2

| Set Address | Address Tag | Valid Bit | Modified Bit | Data |
|---|---|---|---|---|
| 0 | Address Tag 0 | Valid | Modified | Data 0-0 |
| | | Valid | Clean | Invalid |
| | | Invalid | Invalid | Data 0-2 |
| | | Valid | Clean | Data 0-3 |
| 1 | Address Tag 1 | Valid | Clean | Data 1-0 |
| | | Invalid | Invalid | Invalid |
| | | Valid | Modified | Data 1-2 |
| | | Valid | Modified | Data 1-3 |

It should be noted that the valid and modified bits for subsectors in a sectored cache may function in the same way as do the valid and modified bits for cache lines in a non-sectored cache as previously described.

When a new sector needs to be added to the cache, such as in the event of a cache miss, a sector to be replaced must be chosen. A sectored cache replacement algorithm is typically used to determine which sector to be replaced. Such an algorithm may use historical information kept on each sector such as the frequency that such sector is used and how recently such sector was used. In accordance with a conventional cache replacement algorithm known as the sectored least recently used (LRU) algorithm, the least recently used sector among a plurality of replaceable sectors is replaced. The LRU cache replacement algorithm generally produces the best hit rates. However, hit rates are not the only factor required for good performance. Another important factor is the utilization of the bus connecting the cache to main memory. High bus utilization may significantly decrease computer system performance as a performance bottleneck may result from requests waiting to use the bus. A sectored cache can cause bus utilization that is significant and concentrated in time (i.e., "bursty"), since all modified data for a sector being replaced must be written back to main memory. More specifically, if a sector being replaced has a large amount of modified data, the bus between the cache and main memory must be utilized for a significant and concentrated amount of time in order to write back all of the modified data to main memory. Such scenario may occur when multiple subsectors of a sector to be replaced have been modified, thus requiring a writeback for each modified subsector. The LRU cache replacement algorithm and its variants do nothing to reduce such "burstiness".

SUMMARY OF THE INVENTION

The various embodiments described herein provide an improved algorithm for sectored cache replacement in the event of a cache miss. In addition to having a good hit rate, the improved algorithm aims to reduce memory writebacks. Unlike the conventional sectored cache replacement algorithms, which primarily focus upon the hit rate performance factor, the improved algorithm accounts for both hit rate and bus utilization.

The sectored cache replacement algorithm provided in accordance with the various embodiments described herein may be implemented via a method and computer program product. The method may select a cache sector among a plurality of cache sectors for replacement in a computer system. More specifically, the method may comprise determining a first set of cache sectors among the plurality of cache sectors, wherein each of the first set of cache sectors has the least amount of modified data among the plurality of cache sectors and is not the most recently used cache sector. If the first set of cache sectors comprises a single cache sector, the method further may comprise selecting such single cache sector for replacement. Conversely, if the first set of cache sectors comprises multiple cache sectors (i.e., multiple cache sectors have an amount of modified data equal to the least amount of modified data, and none of such multiple cache sectors is the most recently used cache sector), the method further may comprise determining a second set of cache sectors among the first set of cache sectors, wherein each of the second set of cache sectors has the least amount of valid data among the first set of cache sectors. If the second set of cache sectors comprises a single cache sector, the method further may comprise selecting such single cache sector for replacement. Conversely, if the second set of cache sectors comprises multiple cache sectors (i.e., multiple cache sectors have an amount of modified data equal to the least amount of modified data and an amount of valid data equal to the least amount of valid data, and none of such multiple cache sectors is the most recently used cache sector), the method further may comprise selecting a random cache sector among the second set of cache sectors for replacement.

Furthermore, in accordance with another exemplary embodiment, the method further may comprise marking the most recently used cache sector among the plurality of cache sectors in a defined way.

Further advantages of the various embodiments described herein will become clear to the skilled person upon examination of the drawings and detailed description. It is intended that any additional advantages be incorporated herein.

BRIEF DESCRIPTION OF THE DRAWINGS

The various embodiments will now be described by way of example with reference to the accompanying drawings, in which like references denote similar elements, and in which:

FIG. 2 provides a first example illustrating the functionality of the improved sectored cache replacement algorithm;

FIG. 3 provides a second example illustrating the functionality of the improved sectored cache replacement algorithm;

FIG. 4 provides a third example illustrating the functionality of the improved sectored cache replacement algorithm; and FIG. 5 provides a fourth example illustrating the functionality of the improved sectored cache replacement algorithm.

DETAILED DESCRIPTION

Figure 1:
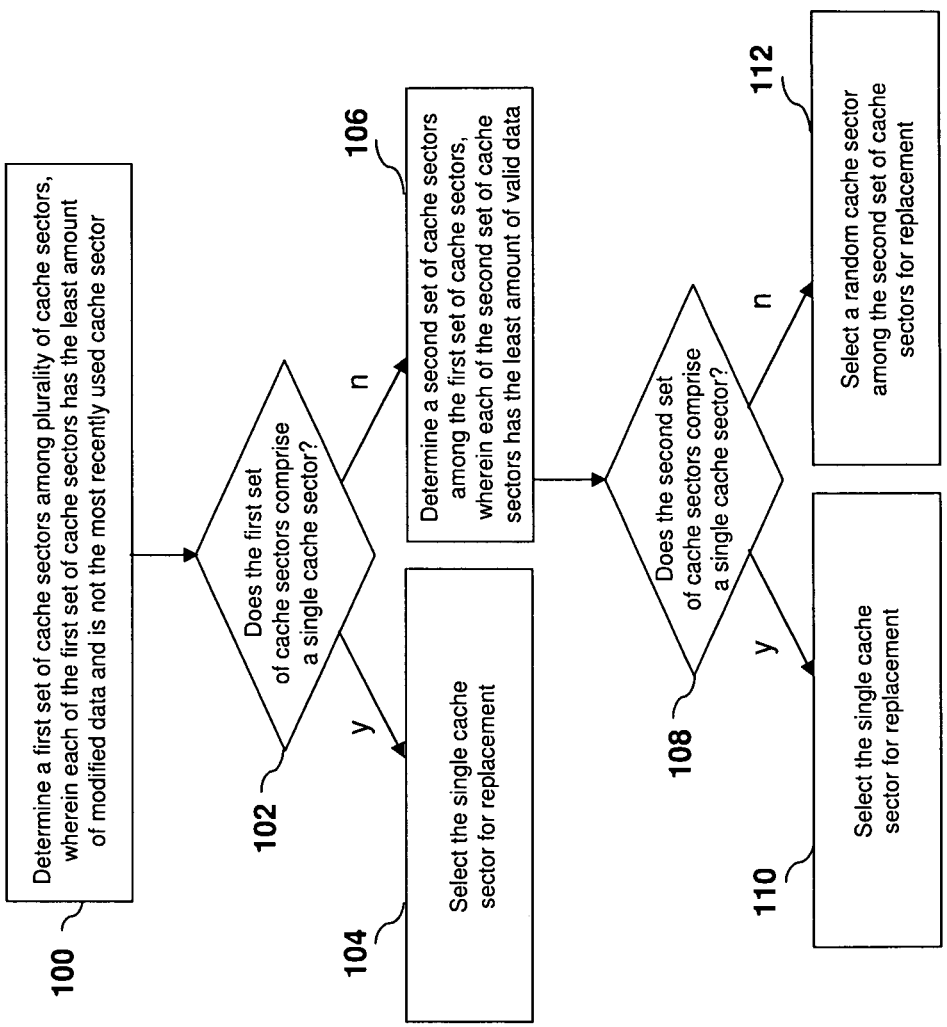
FIG. 1 provides the method for implementing an improved sectored cache replacement algorithm in accordance with an exemplary embodiment.

The various embodiments described herein provide a method and computer program product for implementing an improved sectored cache replacement algorithm. Such method may comprise selecting a cache sector to be replaced that is not the most recently used and that has the least amount of modified data. In the case in which there is a tie among cache sectors (i.e., multiple cache sectors have an amount of modified data equal to the least amount of modified data, and none of such multiple cache sectors is the most recently used cache sector), the sector to be replaced may be the sector among such cache sectors with the least amount of valid data. In the case in which there is a still a tie among cache sectors (i.e., multiple cache sectors have an amount of modified data equal to the least amount of modified data and an amount of valid data equal to the least amount of valid data, and none of such multiple cache sectors is the most recently used cache sector), the sector to be replaced may be randomly selected among such cache sectors.

FIG. 1 illustrates the method for implementing the improved sectored cache replacement algorithm according to an exemplary embodiment. In step 100, a first set of cache sectors may be determined among a plurality of cache sectors, wherein each of the first set of cache sectors has the least amount of modified data among the plurality of cache sectors and also is not the most recently used cache sector. Subsequently, in step 102, it may be determined whether the first set of cache sectors comprises a single cache sector. If it is determined that the first set of cache sectors comprises a single cache sector, then in step 104 such single cache sector may be selected for replacement. Conversely, if it is determined that the first set of cache sectors comprises multiple cache sectors (i.e., there are multiple cache sectors with an amount of modified data equal to the least amount of modified data, and none of such multiple cache sectors is the most recently used cache sector), then in step 106 a second set of cache sectors may be determined among the first set of cache sectors, wherein each of the second set of cache sectors has the least amount of valid data among the first set of cache sectors. Subsequently, in step 108, it may be determined whether the second set of cache sectors comprises a single cache sector. If it is determined that the second set of cache sectors comprises a single cache sector, then in step 110 such single cache sector may be selected for replacement. Conversely, if it is determined that the second set of cache sectors comprises multiple cache sectors (i.e., multiple cache sectors have an amount of modified data equal to the least amount of modified data and an amount of valid data equal to the least amount of valid data, and none of such multiple cache sectors is the most recently used cache sector), then in step 112 a random cache sector among the second set of cache sectors may be selected for replacement.

Furthermore, in accordance with another exemplary embodiment, the method further may comprise marking the most recently used cache sector among the plurality of cache sectors in a defined way. For instance, the most recently used sector may be identified via a directory entry, and each sector among the plurality of cache sectors may have a unique identifier by which the most recently used sector may be identified. More specifically, each sector may be associated with a numerical identifier based on where it is physically located, and such identifier may be stored in a directory entry in order to identify the most recently used sector. For example, if there are four possible sectors that can be replaced for a particular address, then the directory entry identifying the most recently used cache sector may comprise a two-bit identifier that can uniquely identify each of the four sectors (e.g., the identifier "00" may correspond to sector 0, the identifier "01" may correspond to sector 1, the identifier "10" may correspond to sector 2, and the identifier "11" may correspond to sector 3).

Unlike conventional sectored cache replacement algorithms, the improved algorithm provided in accordance with the various embodiments described herein specifically accounts for both cache hit rate and bus utilization. As provided above, the algorithm specifically excludes selection of the most recently used cache sector so that the hit rate will not be adversely affected. So long as the most recently used cache sector is not chosen for replacement, selecting any of the other cache sectors for replacement does not substantially affect the cache hit rate. Moreover, the algorithm enables a greater proportion of modified data to be kept longer in the cache, allowing such data to be further modified before being written back to main memory. Thus, the algorithm reduces bus utilization by reducing the amount of modified data that needs to be written back to main memory.

Four examples will be described to illustrate the functionality of the improved sectored cache replacement algorithm. Each of the sectored caches represented in the examples comprises four sectors designated by a set address (e.g., A, B, C, or D), and each sector in turn comprises four subsectors.

A first example, provided in FIG. 2, provides the initial cache state of all cache sectors being invalid. In this case, Sector A is assumed to be the most recently used sector. No sector contains modified data. Thus, in accordance with the algorithm, the first set of cache sectors comprises Sector B, Sector C, and Sector D, since each of these sectors has the least amount of modified data and also is not the most recently used cache sector. Since the first set comprises more than one sector, a second set of cache sectors is to be selected among the first set of cache sectors in accordance with the algorithm. None of the cache sectors in the first set contains valid data. Thus, in accordance with the algorithm, the second set of cache sectors comprises Sector B, Sector C, and Sector D, since each of these sectors has the least amount of valid data. Since the second set of cache sectors comprises more than one cache sector (Sector B, Sector C, and Sector D), in accordance with the algorithm one of these sectors is chosen at random for replacement. The chosen sector becomes the most recently used sector.

A second example, provided in FIG. 3, provides a more typical case in which all sectors contain valid data. Once again, it is assumed that Sector A is the most recently used sector. Sector B contains two modified subsectors, Sector C contains one modified subsector, and Sector D contains three modified subsectors. In accordance with the sectored cache selection algorithm, the first set of cache sectors comprises only Section C, since Section C alone has the least amount of modified data and also is not the most recently used cache sector. Thus, Sector C is selected for replacement in accordance with the algorithm and becomes the most recently used sector.

A third example, provided in FIG. 4, provides another typical case in which all sectors contain valid data. Once again, Sector A is assumed to be the most recently used sector. Sector B contains two modified subsectors, Sector C contains two modified subsectors, and Sector D contains three modified subsectors. In accordance with the sectored cache replacement algorithm, the first set of cache sectors comprises Sector B and Sector C, since each of these sectors has the least amount of modified data and also is not the most recently used cache sector. Since the first set comprises more than one sector, a second set of cache sectors is to be selected among the first set of cache sectors in accordance with the algorithm. Sector B contains four valid subsectors, and Sector C contains two valid subsectors. Therefore, according to the algorithm, the second set of cache sectors comprises only Sector C, since Sector C alone has the least amount of valid data. Thus, Sector C is chosen for replacement in accordance with the algorithm and becomes the most recently used sector.

A fourth example, provided in FIG. 5, provides another typical case in which all sectors contain valid data. Once again, Sector A is assumed to be the most recently used sector. Sector B contains two modified subsectors, Sector C contains two modified subsectors, and Sector D contains three modified subsectors. Therefore, in accordance with the sectored cache replacement algorithm, the first set of cache sectors comprises Sector B and Sector C, since each of these sectors has the least amount of modified data and also is not the most recently used cache sector. Since the first set comprises more than one sector, a second set of cache sectors is to be selected among the first set of cache sectors in accordance with the algorithm. Sector B contains three valid subsectors, and Sector C also contains three valid subsectors. Therefore, according to the algorithm, the second set of cache sectors comprises Sector B and Sector C, since each of these sectors has the least amount of valid data. Since the second set of cache sectors comprises multiple sectors (Sector B and Sector C), in accordance with the algorithm one of these sectors is chosen randomly for replacement. The chosen sector becomes the most recently used sector.

The various embodiments described herein may assume the form of an entirely hardware embodiment, an entirely software embodiment, or an embodiment containing both hardware and software elements. In an exemplary embodiment, the various embodiments may be implemented in software, which includes but is not limited to firmware, resident software, microcode, etc.

Furthermore, the various embodiments may assume the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CD-ROM), compact disc-read/write (CD-R/W), DVD, and Blu-ray Disc (BD).

A data processing system suitable for storing and/or executing program code may comprise at least one processor coupled directly or indirectly to memory elements through a system bus. The memory elements may comprise local memory employed during actual execution of the program code, bulk storage, and cache memories. Such cache memories may provide temporary storage of at least some program code in order to reduce the number of times code must be retrieved from bulk storage during execution.

Input/output (I/O) devices (including but not limited to keyboards, displays, pointing devices, etc.) may be coupled to the system either directly or via intervening I/O controllers.

Network adapters also may be coupled to the system to enable the data processing system to become coupled to other data processing systems or remote printers or storage devices through intervening private or public networks. Modems, cable modem, and Ethernet cards are among the currently available types of network adapters.

The invention claimed is:

1. A method for selecting a cache sector among a plurality of cache sectors for replacement in a computer system, said method comprising:

determining a first set of cache sectors among said plurality of cache sectors excluding a most recently used cache sector, wherein each of said first set of cache sectors has the least amount of modified data among said plurality of cache sectors excluding said most recently used cache sector;

upon determining that said first set of cache sectors comprises multiple cache sectors, determining a second set of cache sectors among said first set of cache sectors, wherein each of said second set of cache sectors has the least amount of valid data among said first set of cache sectors; and upon determining that said second set of cache sectors comprises multiple cache sectors, selecting a random cache sector among said second set of cache sectors for replacement.

2. The method according to claim 1, further comprising:

upon determining that said second set of cache sectors comprises one cache sector, selecting a second single cache sector for replacement.

3. The method according to claim 1, further comprising marking said most recently used cache sector among said plurality of cache sectors.

4. The method according to claim 3, wherein said marking step comprises storing in a directory entry an identifier corresponding to said most recently used cache sector.

5. A computer program product for selecting a cache sector among a plurality of cache sectors for replacement in a computer system, said computer program product comprising a computer-readable storage medium having computer-readable program code instructions stored therein comprising:

instructions for determining a first set of cache sectors among said plurality of cache sectors excluding a most recently used cache sector, wherein each of said first set of cache sectors has the least amount of modified data among said plurality of cache sectors excluding said most recently used cache sector;

instructions for, upon determining that said first set of cache sectors comprises multiple cache sectors, determining a second set of cache sectors among said first set of cache sectors, wherein each of said second set of cache sectors has the least amount of valid data among said first set of cache sectors; and instructions for, upon determining that said second set of cache sectors comprises multiple cache sectors, selecting a random cache sector among said second set of cache sectors for replacement.

6. The computer program product according to claim 5, further comprising:

instructions for, upon determining that said second set of cache sectors comprises one cache sector, selecting a second single cache sector for replacement.

7. The computer program product according to claim 5, further comprising instructions for marking said most recently used cache sector among said plurality of cache sectors.

8. The computer program product according to claim 7, wherein said instructions for marking said most recently used cache sector comprises instructions for storing in a directory entry an identifier corresponding to said most recently used cache sector.

9. A system comprising:

a processor; and one or more memory elements storing a program, which, when executed on said processor, performs an operation of selecting a cache sector among a plurality of cache sectors for replacement in a computer system, said operation comprising:

determining a first set of cache sectors among said plurality of cache sectors excluding a most recently used cache sector, wherein each of said first set of cache sectors has the least amount of modified data among said plurality of cache sectors excluding said most recently used cache sector;

upon determining that said first set of cache sectors comprises multiple cache sectors, determining a second set of cache sectors among said first set of cache sectors, wherein each of said second set of cache sectors has the least amount of valid data among said first set of cache sectors; and upon determining that said second set of cache sectors comprises multiple cache sectors, selecting a random cache sector among said second set of cache sectors for replacement.

10. The system of claim 9, wherein said operation further comprises:

upon determining that said second set of cache sectors comprises one cache sector, selecting a second single cache sector for replacement.

11. The system of claim 9, wherein said operation further comprises marking said most recently used cache sector among said plurality of cache sectors.

12. The system of claim 11, wherein said marking step comprises storing in a directory entry an identifier corresponding to said most recently used cache sector.

13. The method according to claim 1, further comprising:

upon determining that said first set of cache sectors comprises one cache sector, selecting a first single cache sector for replacement.

14. The computer program product according to claim 5, further comprising:

instructions for, upon determining that said first set of cache sectors comprises one cache sector, selecting a first single cache sector for replacement.

15. The system according to claim 9, wherein said operation further comprises:

upon determining that said first set of cache sectors comprises one cache sector, selecting a first single cache sector for replacement.

* * * * *